(12) United States Patent
Li et al.

(10) Patent No.: US 6,643,825 B1
(45) Date of Patent: *Nov. 4, 2003

(54) METHODS, SYSTEMS, AND COMPUTER PROGRAM PRODUCTS FOR APPLYING STYLES TO HOST SCREENS BASED ON HOST SCREEN CONTENT

(75) Inventors: Yongcheng Li, Raleigh, NC (US); Yih-Shin Tan, Raleigh, NC (US); Brian Webb, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/353,218

(22) Filed: Jul. 14, 1999

(51) Int. Cl.[7] ............................................... G06F 17/21
(52) U.S. Cl. ........................ 715/523; 715/513; 715/517; 715/526; 717/134
(58) Field of Search ................................ 707/513, 517, 707/523, 526; 345/760; 717/134; 715/513, 517, 523, 526

(56) References Cited

U.S. PATENT DOCUMENTS

| | | | | |
|---|---|---|---|---|
| 5,604,896 A | * | 2/1997 | Duxbury et al. ............... | 703/26 |
| 5,845,075 A | * | 12/1998 | Uhler et al. ................. | 709/200 |
| 5,860,073 A | * | 1/1999 | Ferrel et al. ................ | 715/522 |
| 5,940,075 A | * | 8/1999 | Mutschler, III et al. .... | 345/760 |
| 6,122,661 A | * | 9/2000 | Stedman et al. ............ | 709/217 |
| 6,199,081 B1 | * | 3/2001 | Meyerzon et al. .......... | 707/513 |
| 6,229,534 B1 | * | 5/2001 | Gerra et al. ................. | 345/733 |
| 6,266,681 B1 | * | 7/2001 | Guthrie ..................... | 707/501.1 |
| 6,336,124 B1 | * | 1/2002 | Alam et al. ................. | 707/523 |
| 6,374,207 B1 | * | 4/2002 | Li et al. ........................ | 703/27 |
| 6,463,440 B1 | * | 10/2002 | Hind et al. ................. | 707/102 |
| 6,466,955 B1 | * | 10/2002 | Abe ........................... | 707/526 |

FOREIGN PATENT DOCUMENTS

| | | |
|---|---|---|
| WO | WO 98/26359 | 6/1998 |
| WO | WO 99/12109 | 3/1999 |
| WO | WO 00/20985 | 4/2000 |

* cited by examiner

Primary Examiner—Joseph H. Feild
Assistant Examiner—Charles Bieneman
(74) Attorney, Agent, or Firm—Myers Bigel Sibley & Sajovec, P.A.; A. Bruce Clay, Esq.

(57) ABSTRACT

Screens generated by a host application are reformatted for viewing by applying styles to the host screens in response to recognized components included therein. In particular, a style defines a desired look and layout to be applied to a respective host screen. The styles are applied to the respective host screens based on recognizing components of the host screen at run time. For example, first and second styles can be associated with respective first and second components included in host screens. The first style is applied to the host screen in which the first component is recognized and the second style is applied to the host screen in which the second component is recognized. Accordingly, the application of the first and second styles provide respective first and second reformatted screens.

30 Claims, 10 Drawing Sheets

FIG. 1C

SESSION ID: Session A  HOST NAME : ralvms  DISPLAY STYLE : Traditional ▼
                    ORDER PUBLICATIONS        Items    0 to    0 of    0
Publications Support Desk : 1 800-879 2755  8:30AM to 7:00 PM Eastern Time
Enter publication number or use SEARCH to find publication numbers.
Actions:  A=view abstract,  B=show base,  C=show components,  S=show suffixes
          V=view book ("x" only)

Address  IBM CORP                    Employee/Cust #  929856
(NAME)   ATTN: YONGCHENG LI          Division         95
         4205 S. MIAMI BLVD          Department       BRQ
                                     REF
                                     Expedite?  NO CITY  RTP       STATE  NC       ZIP  27709   Total     0.00    IBM
                                                       UOM     Cost
         Title

B502/G113

Item Number        Qty    Act

F1=Help  F2=Clear  F3=Exit  F4=Send Order  F5=Query/Cancel  F6=Publist
F7=Back  F8=Next   F9=Search                    F11=Reports  F12=Cancel

[PF1] [PF2] [PF3] [PF4] [PF5] [PF6] [ENTER] [PA1] [NEWLIN] [INSERT] [ATTN]   [REFRESH]
[PF7] [PF8] [PF9] [PF10] [PF11] [PF12] [CLEAR] [PS2] [DELETE] [SYSREQ] [ALTCUR]

FIG. 1D

Screen Information

| POSITION | LENGTH | PROTECTED | HIDDEN | TEXT |
|---|---|---|---|---|
| 2 | 79 | true | false | SEARCH Items 0 to 0 of 0 |
| 81 | 0 | true | false | |
| 83 | 76 | true | false | |
| 160 | 1 | true | false | |
| 162 | 79 | true | false | Enter the desired search words and press ENTER |
| 242 | 79 | true | false | |
| 322 | 79 | true | false | |
| 401 | 0 | true | false | |
| 403 | 13 | true | false | SEARCH WORDS |
| 416 | 0 | true | false | |
| 418 | 32 | false | false | |
| 450 | 0 | true | false | |
| 452 | 29 | true | false | (Example: as/400 application) |
| 481 | 0 | true | false | |
| 483 | 77 | true | false | Act Item Number Title Media Price |
| 560 | 0 | true | false | |
| 562 | 79 | true | false | |
| 642 | 79 | true | false | |
| 722 | 79 | true | false | |
| 802 | 79 | true | false | |

FIG. 1E

SESSION ID: Session A  HOST NAME: ralvms

PubSearchCont ▶ | REFRESH

Search Puborder

Please enter the desired search words: (Example: AS/400 application)

? | EXIT

FIG. 1F

SESSION ID: Session A   HOST NAME: ralvms

[PubSearchCont ▼]  [REFRESH]

Search Puborder

Please enter the desired search words: (Example: AS/400 application) ← 155

[    ]

🔑

[?]  [EXIT]  ⟳

---

SESSION ID: Session A HOST NAME: ralvms DISPLAY STYLE: [Traditional]
ORDER PUBLICATIONS    Items    0 to    0 of    0
Publications Support Desk: 1 800-879 2755  8:30AM to 7:00 PM Eastern Time
Enter publication number or use SEARCH to find publication numbers.
Actions: A=view abstract, B=show base, C=show components, S=show suffixes
V=view book ('X' only)

Address    ATTN: [IBM CORP]          Employee/Cust # [929656]
(NAME)     [YONGCHENG LI]            Division    95
           [4205 S. MIAMI BLVD]      Department  BRQ
                                     REF         [         ]
                                     Expedite?   [NO]
           CITY [RTP]    STATE [NC]  ZIP [27709]  Total  0.00   IBM
                                                         UOM    Cost
Item Number        Qty   Act   Title
[         ]        [  ]  [ ]   [                    ]
[         ]        [  ]  [ ]   [                    ]
[         ]        [  ]  [ ]   [                    ]
[         ]        [  ]  [ ]   [                    ]
[         ]        [  ]  [ ]   [                    ]
[         ]        [  ]  [ ]   [                    ]
                                     B502/G113

F1=Help F2=Clear F3=Exit F4=Send Order F5=Query/Cancel F6=Publist
F7=Back F8=Next F9=Search                 F11=Reports F12=Cancel
[PF1] [PF2] [PF3] [PF4] [PF5] [PF6] [ENTER] [PA1] [NEWLIN] [INSERT] [ATTN] [REFRESH]
[PF7] [PF8] [PF9] [PF10] [PF11] [PF12] [CLEAR] [PS2] [DELETE] [SYSREQ] [ALTCUR]

---

Screen Information

| POSITION | LENGTH | PROTECTED | HIDDEN | TEXT |
|---|---|---|---|---|
| 2 | 79 | true | false | SEARCH Items 0 to 0 of 0 |
| 81 | 0 | true | false | |
| 83 | 76 | true | false | |
| 160 | 1 | true | false | |
| 162 | 79 | true | false | Enter the desired search words and press ENTER |
| 242 | 79 | true | false | |
| 322 | 79 | true | false | |
| 401 | 0 | true | false | SEARCH WORDS |
| 403 | 13 | true | false | |
| 416 | 0 | false | false | |
| 418 | 32 | false | false | |
| 450 | 0 | true | false | (Example: as/400 application) |
| 452 | 29 | true | false | |
| 481 | 77 | true | false | Act Item Number Title Media Price |
| 483 | 0 | true | false | |
| 560 | 0 | true | false | |
| 562 | 78 | true | false | |
| 642 | 78 | true | false | |
| 722 | 78 | true | false | |
| 802 | 78 | true | false | |

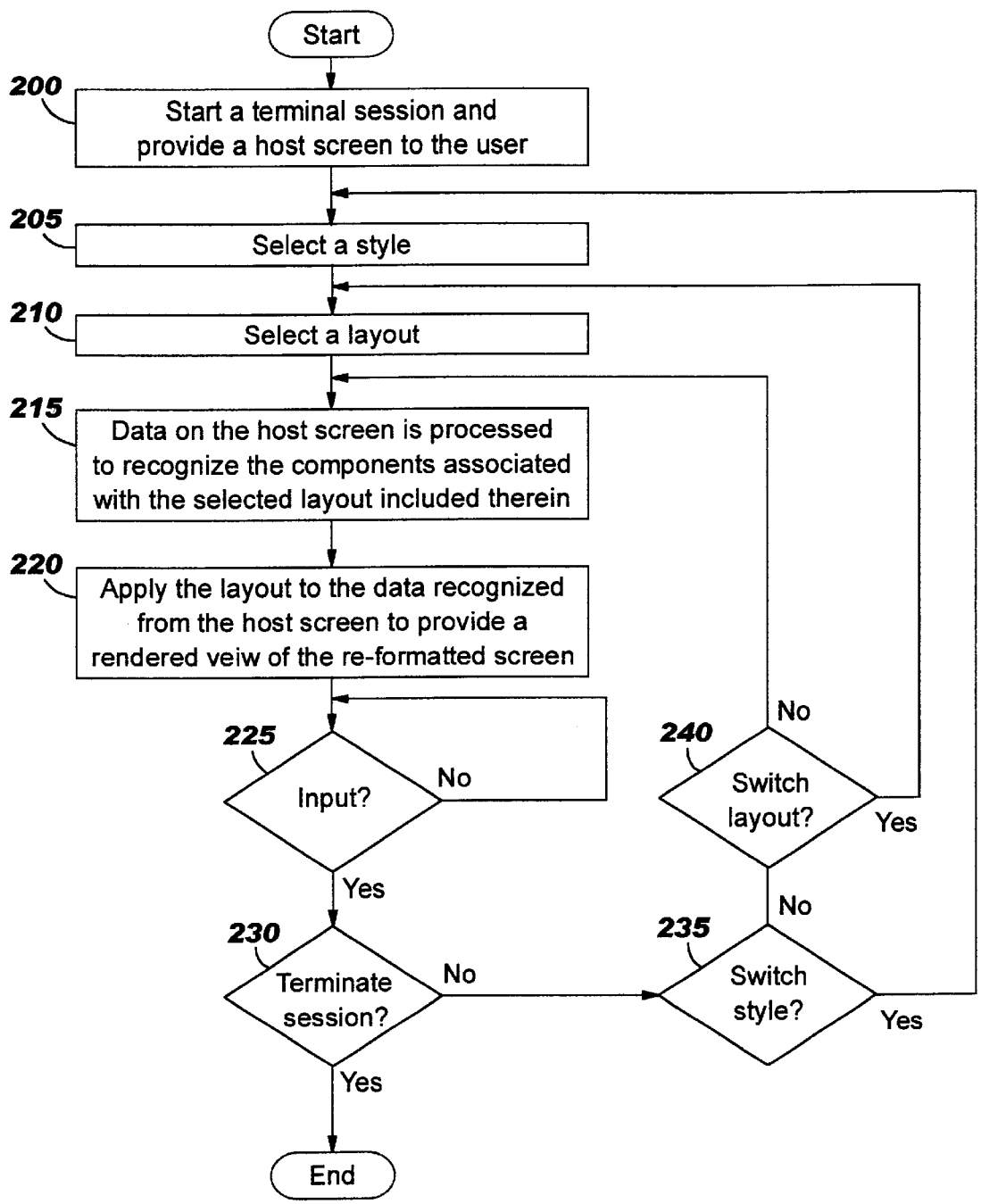

FIG. 5

E:\temp\callup.html - Microsoft Internet Explorer
File  Edit  View  Favorites  Tools  Help
Address E:\temp\callup.html

[refresh] — 600

605

| Name | Act | EmpSt | Tie-line | Node User ID | External-Phone |
|---|---|---|---|---|---|
| Li, Michael C.T. | ☐ | Reg | 541-4095 | IBMUSM37 MCLI | 1-919-301-4095 |
| Li, Ruey-Feng | ☐ | Mgr | 526-5030 | IBMUSM21 RLIO | 1-919-486-5030 |
| Li, Shuping *CONTRACTOR* | ☐ | Contr | 352-5937 | | 1-919-301-5937 |
| Li, Xiaobo | ☐ | Reg | | IBMUSM38 LIX | 1-919-486-2441 |
| Li, Yi *CONTRACTOR* | ☐ | Contr | 444-4904 | IBMUSM27 YILI | 1-919-254-4904 |
| Li, YongCheng | ☐ | Reg | 526-2693 | IBMUSM21 YCLI | 1-919-486-2693 |

7 12 14

| A | B | C | D | E | F |
|---|---|---|---|---|---|
| Address | Backup | CC-list | Calendar | Dept title | Feedback |
| Show Ids | JobResp(1pers) | | | Local data | Update/Open |
| P | R | K | T | L | O |
| Phones | Rpts-To-All | To-list | | | View record |
| | | | | Rpts-Chain | V |

610

Command ⇨ _____ 615

| Actions | Dist list | Cancel | Press Enter |
| Exit | Send note | Rpts To All | Show dept/team | Backward | Forward | JobReso(all) |

620

Auto Extraction
of Components -
Callup Result

Help | Set 2

METHODS, SYSTEMS, AND COMPUTER PROGRAM PRODUCTS FOR APPLYING STYLES TO HOST SCREENS BASED ON HOST SCREEN CONTENT

FIELD OF THE INVENTION

The present invention relates to the field of computer programming in general and more particularly to terminal emulation.

BACKGROUND OF THE INVENTION

It is known to use script languages, such as Extensible Markup Language (XML), to provide terminal emulation for legacy host based applications and the data provided by the applications. For example, data provided by host applications traditionally accessed using 3270 terminal emulation may be reformatted using XML, which can enable the data and application to be accessed via a World Wide Web (WWW) browser rather than a video terminal.

Moreover, the reformatted data can be presented to the end user in a variety of styles by applying respective mappings to the reformatted data from the host application, such as those written in Extensible Stylesheet Language (XSL). For example, a host application that presents 10 items on a screen where each item has 2 associated fields can be reformatted and presented to the user as a table of 2 rows and 10 columns by applying a first style or as a bulleted list of 20 items by applying a second style. Both styles may be desirable because some users may wish to see the data in the first style while other users wish to see the data in the second style.

It may be difficult and time consuming to develop all of the different presentation styles desired by different users of the data. In particular, some conventional systems may store a predetermined reformatted screen for each presentation style desired of the screens provided by the host application. For example, if two presentation styles are desired for a host application which provides a total of six screens of data, a conventional system may provide all of the desired styles by previously generating and storing twelve reformatted screens: two presentation styles for each of the six screens of data generated by the host. At run time, the system searches a database to determine which of the host screens is displayed and matches the previously generated reformatted screen that corresponds to the host screen which is then displayed.

Unfortunately, the time to generate the reformatted screens for all of the presentation styles desired by the users can increase the development time and cost of such systems. Such systems can also create a burdensome amount of computational overhead at run-time, therefore, leading to poor system performance. Furthermore, if the screen format of the data provided by the host application changes, the previously generated reformatted screens may not function properly. Software may be provided to automatically extract the data and present it in the desired style, however, specific knowledge of the host application may be needed to develop such software. Consequently, there is a need for improved generation of reformatted screens for legacy host applications

SUMMARY OF THE INVENTION

It is an object of the present invention to allow improved terminal emulation for legacy host systems.

It is another object to allow improvement in the development of terminal emulation for legacy host systems.

These and other objects can be provided by methods, systems, and computer program products that reformat a host screen generated by an application that includes components thereon. The reformatted screen is generated automatically by arranging selected components from the host screen according to one of a plurality of predetermined styles, wherein the components are selected from the host screen upon determining that an organization of the components on the host screen matches a layout of the reformatted screen associated with one of the plurality of the predetermined styles.

Accordingly, the present invention can allow a reduction in the amount of manual interaction by the user. In particular, the host screen is reformatted based on the layout. The layout specifies the components which will be extracted from the host screen and displayed according to the predetermined style.

According to another aspect of the present invention, the layout specifies a spatial arrangement for the components selected from the host screen. A first data structure is generated that describes the organization for components selected from the host screen on the reformatted screen. The organization of the components on the host screen is compared to the organization of the layout. The components are selected from the host screen which match the organization of the layout.

In still another aspect of the present invention, the comparison is performed by determining starting and ending positions of sequentially ordered components on the host screen and comparing the respective starting and ending positions of the sequentially ordered components on the host screen. The organization of the components on the host screen is determined based on the comparison of the respective starting and ending positions of the sequentially ordered components on the host screen.

In a further aspect of the present invention, a second data structure is generated by including the selected components from the host screen in the first data structure and the reformatted display is generated based on the second data structure.

In yet another aspect of the present invention, a second reformatted screen is generated when the layout of the reformatted screen associated with one of the plurality of the predetermined styles is changed.

BRIEF DESCRIPTION OF THE DRAWINGS

FIGS. 1C–1E are display captures of exemplary styles for reformatting host screens according to the present invention.

FIG. 1F is a representation of a graphical user interface used for the selection of styles and layouts according to the present invention.

FIG. 2 is a flowchart that illustrates operations of selecting styles and layout for reformatted screens according to the present invention.

FIG. 5 is a display capture of a reformatted screen including data recognized from a host screen and reformatted according to the present invention.

DETAILED DESCRIPTION OF THE PREFERRED EMBODIMENTS

Figure 1A:
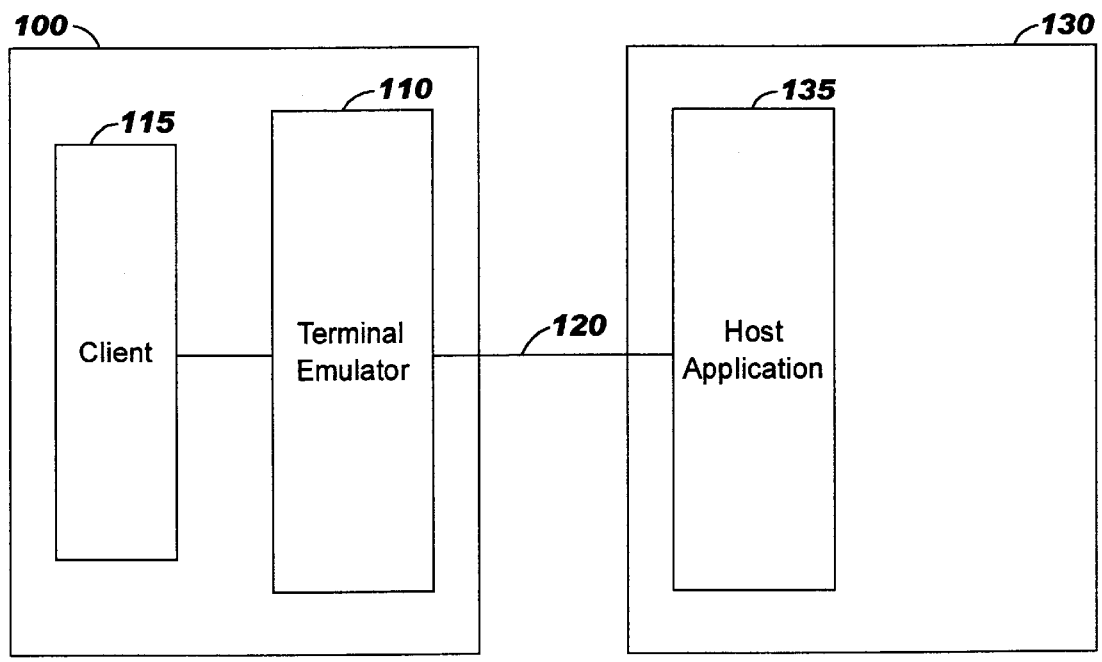
FIG. 1A is a block diagram of an embodiment of a terminal emulator program.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein using flowchart illustrations and block diagrams. It will be understood that each block of the block diagrams or flowchart illustrations, and combinations of blocks in the block diagrams or flowchart illustrations, can be implemented by computer program instructions. These program instructions may be provided to a processor(s) within a computer system, such that the instructions which execute on the processor(s) create means for implementing the functions specified in the block diagrams or flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the block diagrams or flowchart block or blocks.

Accordingly, blocks of the block diagrams or flowchart illustrations support combinations of means for performing the specified functions, combinations of steps for performing the specified functions and program instruction means for performing the specified functions. It will also be understood that each block of the block diagrams or flowchart illustrations, and combinations of blocks in the flowchart illustrations, can be implemented by special purpose hardware-based systems which perform the specified functions or steps, or combinations of special purpose hardware and computer instructions.

It will be understood that the term "application" as used herein includes resources from which a client requests service. As used herein the term "client" includes applications which request services from resources. The clients and the applications described herein (in whole or in part) may be remote from one another or resident in the same location. As used herein the term "ScriptUnit" refers to a collection of related XML tags and characters included between the characters (ScriptUnit) and (/ScriptUnit). As used herein the term "terminal emulation" includes any form of user or programmable access and interactions with datastreams generated from the resources. A terminal emulation session is conducted by a terminal emulation program between the client and the application by transitioning from one terminal emulation state to another to provide the service requested by the client. Those having skill in the art will understand that a screen is a visualization of host datastreams in traditional terminal emulation. As used herein the term "screen" refers to the contents of datastreams exchanged between the client and resources.

FIG. 1A is a block diagram of an embodiment of a terminal emulation program 110 that provides terminal emulation sessions for a client 115 running on a workstation 100 that interfaces with an application 135 running on a host computer 130 via a connection 120. The terminal emulation program 110 receives output from the application 135 in the form of host screens that are characterized by components such as tables and paragraphs of data and keywords, such as "username:" on the screen which are displayed on a display device.

It will be understood that, the user and the client 115 may be remote from each other such as when the terminal emulation program 110 runs on a mid-tier server to conduct terminal emulation sessions for multiple clients (such as web browsers) running on respective client workstations. It will also be understood that the user can a web browser.

The workstation 100 can comprise an input device with a display such as a computer terminal with a web browser, a personal computer, a networked computer, a smart phone, a personal digital assistant, a handheld computer, or the like.

According to the present invention, screens generated by the application 135 running on the host are reformatted for viewing by applying styles to the host screens in response to recognized components included therein. In particular, a style defines a desired look and layout to be applied to a respective host screen for displaying the host screen on the user's display device. The styles are applied to the respective host screens based on recognizing components of the host screen at run time. For example, a first style can be associated with a first component included in a host screen and a second style can be associated with a second component included in a host screen. The first style is applied to the host screen in which the first component is recognized and the second style is applied to the host screen in which the second component is recognized. Accordingly, the application of the first and second styles provide respective first and second reformatted screens for display on the user's display device.

At run-time, the host screens are processed to recognize the component associated with the selected style. When the component is recognized, the associated style is applied and a data structure that describes the content of the reformatted screen is generated. The reformatted screen is generated for display using, for example, a style sheet generator that operates on the data structure. Furthermore, a user can interact with the application and select styles to be associated with the host screens encountered. The interaction can be saved for later execution so that a user can re-apply the same styles to the same host screens in a subsequent session.

Figure 1B:
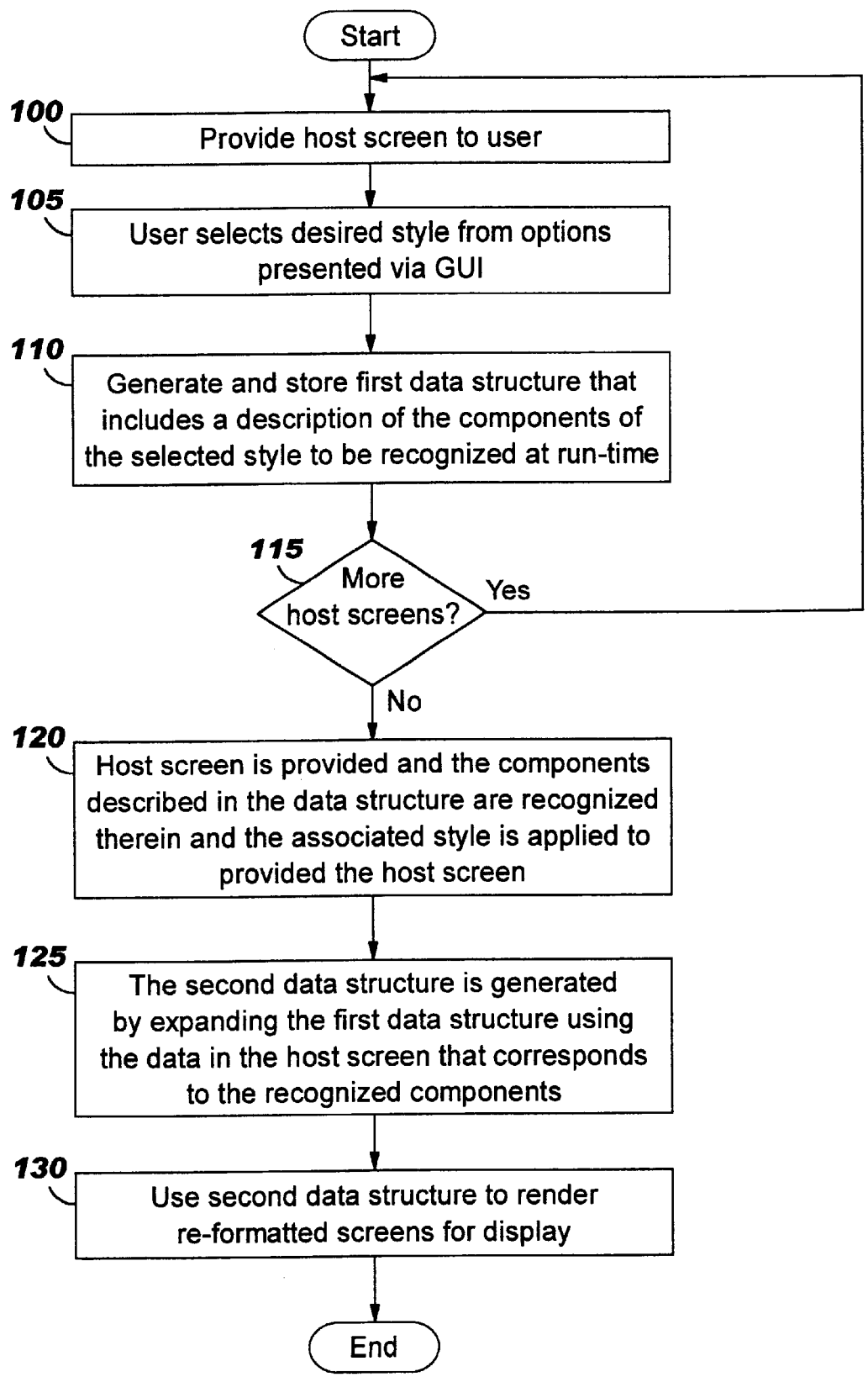
FIG. 1B is a flowchart that illustrates operations of generating reformatted screens according to the present invention.

FIG. 1B is a flowchart that illustrates operations of generating reformatted screens according to the present invention. According to FIG. 1B, a host screen is provided to a user, such as a developer or an administrator (block 100). The host screen can comprise an XML stream that represents the data included in the host screen. The user selects a desired style to be applied to the host screen, using, for example, a GUI (block 105). A first data structure, such as an XML data structure, is generated and stored that includes a description of the components of selected style to be recognized at run-time for reformatting the host screen (block 110). The above steps are repeated for all of the hosts screens that the user wishes to reformat (block 115).

When the application 135 is run (i.e., at run-time), the host screen is provided and the components described in the first data structure are recognized in the host screen whereupon the style described in the first data structure is applied thereto (block 120). The second data structure is generated by expanding the components described in the first data structure with the data in the host screen that corresponds to the recognized components (block 125). The second data structure is used to render the reformatted screens for display to an end user, such as a data entry clerk who uses the application (block 130). Accordingly, developers or administrators can develop the styles and layouts of the reformatted screens while end user, who may be less familiar with programming aspects, can use the application without needing to understand how to reformat the host screens, thereby alleviating some of the burden on the end user. Moreover, the present invention may provide a more convenient way to create styles and layouts through the extraction of components. In contrast, some conventional systems create styles by manually selecting fields from the host screen.

For example, FIGS. 1C–1E are captures of the display of reformatted screens rendered for display using styles according to the present invention. In particular, FIGS. 1C–1E are generated from the same XML stream, each of which can be generated at run-time by selecting the corresponding style and layout. FIG. 1C is a capture of the display of a reformatted screen of a publication ordering application reformatted for display using a "traditional style" provided by the GUI. FIG. 1D is a capture of the display of a reformatted screen of a publication ordering application reformatted for display using a "detailed style" provided by the GUI. FIG. 1E is a capture of the display of a reformatted screen shot of the publication ordering application reformatted for display using a "web style" provided by the GUI.

Each of the style options shown in FIG. 1F can include a layout parameter listed in Table 1 below, such as a paragraph or a table. For example, the web style shown in FIG. 1E and FIG. 1F includes a paragraph layout parameter 155 from Table 1 which indicates that all occurrences of paragraphs recognized in the host screen will be formatted as paragraphs on the reformatted screen according to the selected style (i.e., the web style in FIG. 1E). Accordingly, the data "Please enter the desired search words: (Example. AS/400 application)" is recognized in the XML data stream from the application as formatted as a paragraph and is extracted for display on the reformatted screen.

Moreover, only the components associated with the layout parameters included in the selected style option may be recognized in the host screen. In other words, data which is not formatted as one of the components associated with the selected style option will not appear on the reformatted screen. For example, according to the example described above, data in the XML stream from the host application which is not formatted as a paragraph will not be recognized and extracted from the XML stream for display in the reformatted screen.

The styles to be applied to the host screens can be selected using an application with a GUI such as Smartmasters® marketed by International Business Machines (IBM®). As shown in FIG. 1F, using Smartmasters®, a user may be presented with graphical representations of the different styles (types, looks, and layouts) which can be applied to host screens for reformatting such as those shown in FIGS. 1C–1E. The user selects the desired style via the GUI of the Smartmasters® whereupon the user's selection is saved for use in creating an XML data structure that includes a description of the selected layout option. It will be understood that other applications may be used to provide the GUI.

Defining Styles To Be Applied to Host Application Screens

Referring to block 105 of FIG. 1B, a style defines a document type, a look, and a layout to be applied to a host screen. The document type can be, for example, a Hypertext Markup Language (HTML) document or any document type that can be processed for display. The look defines the general appearance of the reformatted screen such as fixed headings, banners, and background colors of the reformatted screen. The layout specifies the components to be recognized in the host screens and organization of the recognized components in the reformatted screen.

The components can be constructs commonly found in host screens such as fields, tables, action lists, select option lists, function key lists, paragraphs, function keys, command lines and the like. For example, the layout can be specified as an "input table", wherein input fields, and the text that precedes the input fields, are recognized in the host screens and are reformatted as a table in the reformatted screen. Table 1 below describes some exemplary layouts, the respective components recognized in the host screens and how the components are displayed on the reformatted screen.

TABLE 1

| Layout | Components |
| --- | --- |
| Detailed | Show the contents and characteristics of all fields in linear order |
| Plain | Show all fields in the traditional terminal window format |
| Blank | Don't show anything |
| Paragraph | Show all occurrence of paragraphs |
| Table | Show all occurrence of tables |
| Input table | Show all input fields with their preceding text to form a table |
| Action list | Show all occurrence of action item lists |
| Selection option list | Show all occurrence of selection option lists |
| Function key list | Show all occurrence of function key selection lists |
| Paragraph-table | Show all occurrence of tables with preceding paragraphs |
| Paragraph-input table | Show all input fields with their preceding text to form a table with a preceding paragraph |
| Paragraph-action list | Show all occurrence of action item lists with preceding paragraphs |
| Paragraph-selection option list | Show all occurrence of selection option lists with preceding paragraphs |
| Paragraph-function key list | Show all occurrence of function key selection lists with preceding paragraphs |
| Heading line-paragraph | Show all occurrence of paragraphs with preceding text as headings |
| Heading line-paragraph-table | Show all occurrence of tables with preceding paragraphs and preceding text as headings |
| Heading line-paragraph-input table | Show all input fields with their preceding text to form a table and a preceding text as heading |
| Heading line-paragraph-action list | Show all occurrence of action item lists with prceeding paragraphs and preceding text as headings |
| Heading line-paragraph-selection option list | Show all occurrence of selection option lists with preceding paragraphs and preceding text as headings |
| Heading line-paragraph-function key list | Show all occurrence of function key selection lists with preceding paragraphs and preceding text as headings |

The styles to be applied to the host screens can be selected using an application with a GUI such as Smartmasters®. For example, using Smartmasters®, a user may be presented with several layout options for the reformatted screen such as a Web style and a traditional style. The user selects the desired layout option via the GUI of the Smartmasters® whereupon the user's selection is saved for use in creating an XML data structure that describes the selected layout option.

Styles can be customized by selecting a "blank" option provided by the Smartmasters®. A user may specify the desired components from, for example, a complete list of the recognizable components, may aggregate data from multiple host screens into a single reformatted screen, or may supplement the display of the components with data from other sources Such as images, buttons, and Uniform Resource Locators (URLs).

Creating Style Descriptions Referring to block 110 of FIG. 1B, when a style is selected, the style is processed to generate the first XML data structure, called a StyleDescription, that describes the selected style. For example, a StyleDescription created with Smartmasters® is provided below, wherein the document type is HTML, the look is standard and the layout is specified as paragraph-table from Table 1:

```
(StyleDescription)
    (Smartmaster)
        (Name)name of Smartmaster(/Name)
        (Doc Type="html" Look="standard"/)
    (/Smartmaster)
    (Layout)
        (RecurringBlock)
            (Component type="paragraph"/)
            (Component type="table"/)
        (/RecurringBlock)
        (Interaction)
            (Action_to_select type="command" cap="" value=""/)
        (/Interaction)
    (/Layout)
(/StyleDescription)
```

Specifically, the StyleDescription includes Smartmaster tags that refer to the Smartmaster® selected by the user and the associated document type and look. The Layout tag specifies multiple occurrences of paragraph and table components (Component Type="paragraph" and Component Type= "table") and an Interaction tag that specifies a command line input (Action_to_select type='command' cap="value=").

The tags included between the Layout and /Layout tags are generated based on the layout specified by the Smartmaster® selected by the user and the layout's relationship to the components in the host application screen described in Table 1. For example, the StyleDescription above can be created by selecting a style from Smartmasters®, wherein the style includes the paragraph and table layout parameters listed in Table 1. The paragraph and table layout parameters specify that all occurrences of paragraphs and tables recognized in the host screen are to be shown in the reformatted screen according to the layout.

Accordingly, the StyleDescription selected using Smartmasters® includes Component Type tags for all occurrences of paragraphs and tables appearing in the host application screen. A single GUI can, therefore, be used to generate multiple StyleDescriptions from the same host application screens. The StyleDescriptions can be stored in a preference directory accessible to the user or to a group of users.

Recognizing Contents of the Host Application Screens

Referring to block 120 of FIG. 1B, the host application screens are processed at run-time to recognize the components included between the Layout tags in the StyleDescription. In particular, the system determines which components are to be recognized based on the Component tags included in the first data structure. The data on the host screen is processed to recognize the desired components. The data is recognized using rules and heuristics described herein.

Generating Data Structures and Rendering the Reformatted Screens

Referring to block 125 of FIG. 1B, when the data on the host screen is recognized as matching a component specified in the StyleDescription, the data is extracted from the host screen and used to generate a second data structure, referred to as a PreStyleContent. The PreStyleContent describes the data recognized as components of the host screen in the format specified by the Component Types included between the Lay out tags in the StyleDescription, in particular, the data recognized as components of the host screen is used to expand the StyleDescription. For example, the PreStyleContent data structure listed below describes the paragraph and table contents recognized in the host screen.

```
(PreStyleContent)
    (Smartmaster)
        (Name)name of Smartmaster(/Name)
        (Doc Type="html" Look="standard"/)
    (/Smartmaster)
    (Content/)
        (Title) Title(/Title)
        (Paragraph)
            first data recognized as a paragraph on the host screen is
            included here
        (/Paragraph)
        (Table)
            first data recognized as a table on the host screen is
            included here
        (/Table)
        (Paragraph)
            second data recognized as a paragraph on the host screen is
            included here
        (/Paragraph)
        (Table)
            second data recognized as a table on the host screen is
            included here
        (/Table)
            more paragraphs and tables included here
            more paragraphs and tables included here
        (Interaction)
            (Action_to_select type="command" cap="" value=""/)
        (/Interaction)
    (/Content)
(/PreStyleContent)
```

In particular, the paragraph tags and the associated text included between the (Content) and (/Content) tags, describes the data on the host screen which is formatted as a paragraph (Content Type=paragraph). The Table tag and the associated text included between the (Content) and (/Content) tags, describes the data in the host application screen which is formatted as a table (Content Type=table). Moreover, the tags included between the (Content) and (/Content) tags describe multiple occurrences of the particular Content Type in accordance with the RecurringBlock tag included in the StyleDescription. The second data structure described by the PreStyleContent is provided to a style sheet generator that renders the reformatted screen for display.

Accordingly, the reformatted screen can be generated by selecting a style, via a Smartmasters® GUI, to be associated with a respective host screen as shown in FIG. 2. In particular, a host session is started and a screen is presented to the user (block 200), whereupon the user selects a style, using Smartmasters®, to be applied to the host application screen (block 205). The user selects a layout for the selected style (block 210) and data on the host screen is processed to recognize the components associated with the selected layout included therein (block 215). The layout is applied to the recognized components of the host screen to provide a rendered view of the reformatted screen (block 220).

The user can then provide input to the host application, such as via an input field component provided as part of the reformatted screen (block 225). If the user input terminates the session (block 230) processing ends. If the user input indicates a change to the Smartmaster (block 235) processing continues at block 205. If the user input indicates a change to the layout (block 240) processing continues at block 210. If no change is indicated in the either the Smartmaster or the layout (block 240) processing continues at block 215.

Applying Styles Based on Terminal Emulation States

The interaction described above in relation to FIG. 2 can be recorded on a state-by-state basis to create a group of styles and associated layouts that can be used to reformat host screens in future sessions by various users. For example, references to StyleDescriptions can be included in ScriptUnits that can be used to identify present and next states of interaction with the terminal session. Accordingly, as the terminal session progresses from one state to another, different StyleDescriptions can be applied to the respective host screens that trigger the state transitions. Representing states of interaction with host applications are discussed, for example, in U.S. patent application Ser. No. 09/247261 filed Feb. 10, 1999, entitled "Methods, Data Structures, and Computer Program Products for Representing States of Interaction in Automatic Host Access and Terminal Emulation Using Scripts" which is assigned to the assignee of the present application and which is incorporated herein by reference in its entirety.

Referring again to FIG. 1A, the terminal emulation program 110 determines which screen the application 135 provides by examining the features on the screen to determine the present state. The terminal emulation program 110 responds to the screens by sending data, such as characters, to the application 135. For example, when the application 135 provides a login screen to the terminal emulation program 110, the terminal emulation program 110 determines that the screen includes the feature UserID and inputs a username/password to the application 135 which logs the client 115 into the application 135.

The terminal emulation session carried out by the terminal emulation program 110 progresses by transitioning between known terminal emulation states. The terminal emulation states represent discrete situations in the terminal emulation session arrived at via a series of screens provided by the application 135 and responses thereto provided by the terminal emulation program 110. For example, after providing the username/password as described above the terminal emulation session transitions to one of three next terminal emulation states depending on the screen provided by the application in response to the username/password from the client.

An exemplary ScriptUnit that can be used to represent states of interaction is:

```
(ScriptUnit)
    (ScriptID)name of Script Unit(/ScriptID)
        (StateDescription)
            (Keyword) a term that appears on the screen (/Keyword)
        (/StateDescription)
        (Action)
            Input from terminal emulation program to Application
        (/Action)
        (Extraction)
```

-continued

```
            Output from application to terminal application program
        (/Extraction)
        (NextScreen)
            (ScriptID)First possible next state(/ScriptID)
            (ScriptID)Second possible next state(/ScriptID)
            (ScriptID)Third possible next state(/ScriptID)
            ...
        (/NextScreen)
(/ScriptUnit)
```

The ScriptUnit that represents the present terminal emulation state provides the characters included between the Action tag to the application. In response, the application provides a screen to the ScriptUnit that represents the present terminal emulation state. The Keyword included in the first ScriptUnit in the list of possible next states is compared to the features of the screen provided by the application.

If the Keyword included in the first ScriptUnit in the list of possible next states matches the features of the screen provided by the application, the terminal emulation program transitions to the ScriptUnit that matches the features of the state provided by the application (representing the next terminal emulation state). If the features included in the first ScriptUnit in the list of possible next states does not match the features of the screen provided by the application, the features included in the next ScriptUnit in the list of possible next states is selected and compared to the features of the screen provided by the application. This process continues until a match is found. If an unexpected state is encountered, a default action will be taken to terminate the script.

According to the present invention, ScriptUnits that represent the states of interaction with the application include the StyleDescription tags described herein. When the terminal emulation enters a state, the corresponding style and layout are applied to the host screen. Moreover, as the state of terminal emulation changes, the style and layout applied can also change. For example, first and second ScriptUnits that describe respective first and second states of interaction can include a first and second StyleDescription. When the terminal emulation is in the first state, the host screen is reformatted by applying the first StyleDescription and when the terminal emulation is in the second state, the host screen is reformatted by applying the second StyleDescription. Therefore, the styles can be switched automatically.

Figure 3:
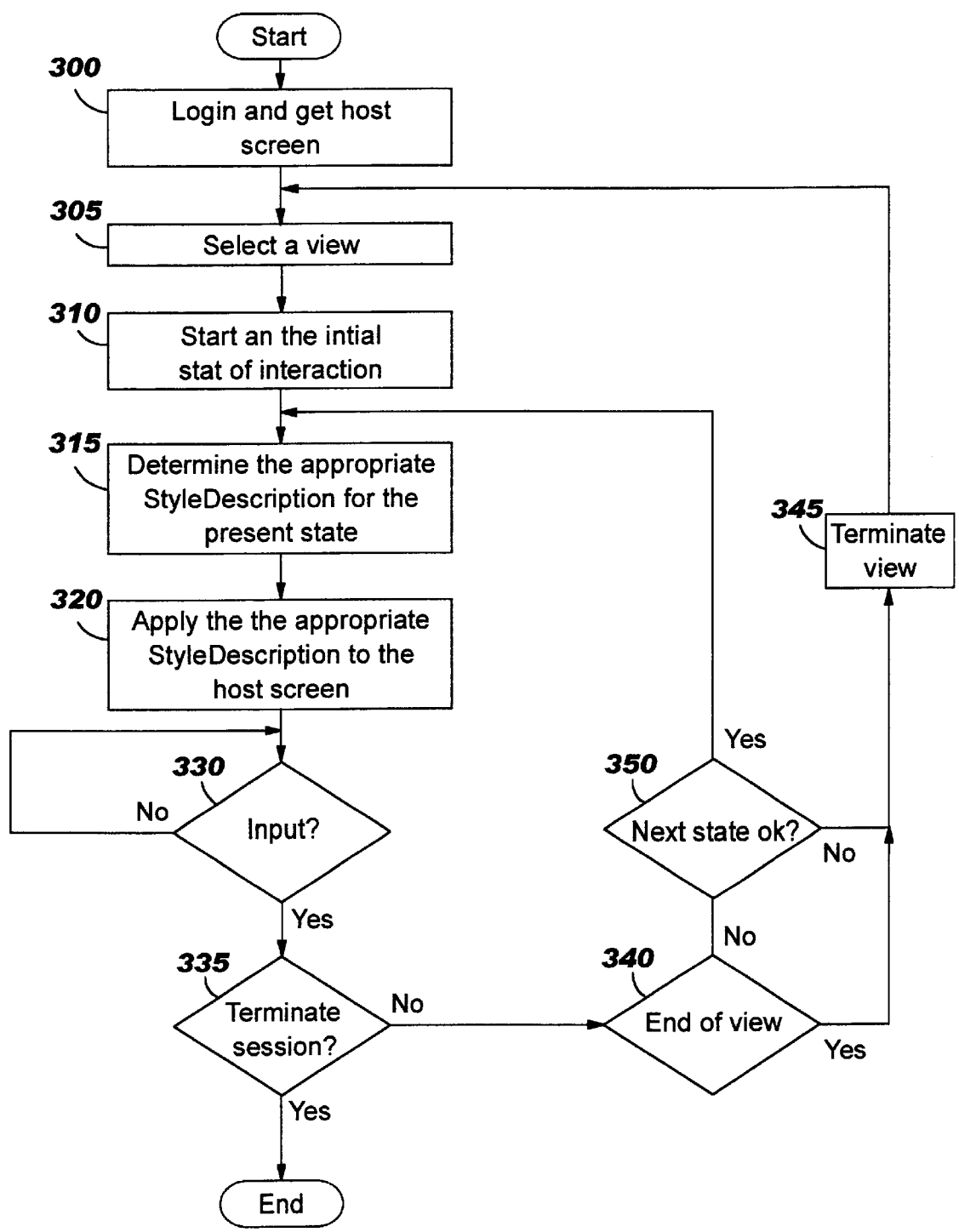
FIG. 3 is a flowchart that illustrates operations of generating reformatted screens using the selected styles and layouts according to the present invention.

FIG. 3 is a flowchart that illustrates operations of a terminal emulation program that represents interaction with a host using ScriptUnits including StyleDescriptions according to the present invention. According to FIG. 3, a user logs into a host application to begin a terminal emulation session (block 300). The user selects a view (block 305) and the terminal emulation begins in the initial state (block 310) as the present state.

The terminal emulator determines the appropriate StyleDescription for the present state based on the tags included in the ScriptUnit that represents the present state (block 315). The appropriate StyleDescription is applied to the host screen (block 320) and the user provides any input requested via the reformatted screen (block 330). If the input terminates the session, processing ends (block 335).

If input causes the terminal emulation to transition to the final state of the view (block 340), the view is terminated (block 345) and processing continues at block 305. If, however, the input causes the terminal emulation to transition to a valid next state (block 350), processing continues at block 315. If the next state is not valid (block 350), the view is terminated.

An exemplary set of ScriptUnits including StyleDescriptions comprising a view includes:

```
(ScriptUnit)
    (ScriptID)ready(ScriptID)
    (StateDescription)
        (Keyword)Ready;(/Keyword)
    (/State Description)
    (StyleDescription)
        . . . . . . style specifications . . . . .
    (/StyleDescription)
    (NextState)
        (ScriptID)book order(/ScriptID)
        (ScriptID)phone lookup(/ScriptID)
    (/NextState)
(/ScriptUnit)
(ScriptUnit)
(ScriptID)bookorder(/ScriptID)
    (StateDescription)
        (Keyword)xxxxxxxx(/Keyword)
    (/StateDescription)
    (StyleDescription)
        . . . . . .style specifications . . . . .
    (/StyleDescription)
    (NextState)
        (ScriptID)bookorderSearch(/ScriptID)
        (ScriptID). . . other state name for the book order
        subtasks . . . (/ScriptID)
    (/NextState)
(/ScriptUnit)
(ScriptUnit)
    (ScriptID)bookorderSearch(/ScriptID)
    (StateDescription)
        (Keyword)xxxxxxxx(/Keyword)
    (/StateDescription)
    (StyleDescription)
        . . . . . .style specifications . . . . .
    (/StyleDescription)
    (NextState)
        (ScriptID)SearchLoop(/ScriptID)
        (ScriptID)SearchEnd(/ScriptID)
    (/NextState)
(/ScriptUnit)
(ScriptUnit)
    (ScriptID)SearchLoop(/Script ID)
    (StateDescription)
        (Keyword)xxxxxxxx(/Keyword)
    (/StateDescription)
    (Prompts)
        . . . . . . prompts included here . . . . . . . . .
    (/Prompts)
    (/Extracts)
        . . . . . . extracts included here . . . . . . . . .
    (/Extracts)
    (Action)
        . . . . . . action included here . . . . . . . . .
    (/Action)
    (NextState)
        (ScriptID)SearchLoop(/ScriptID)
        (ScriptID)SearchEnd(/ScriptID)
    (/NextState)
(/ScriptUnit)
(ScriptUnit)
    (ScriptID)SearchEnd(/ScriptID)
    (StateDescription)
        (Keyword)xxxxxxxx(/Keyword)
    (/StateDescription)
    (Prompts)
        . . . . . . prompts included here . . . . . . . . .
    (/Prompts)
    (Extracts)
        . . . . . . extracts included here . . . . . . . . .
    (/Extracts)
    (Action)
        . . . . . . action included here . . . . . . . . .
    (/Action)
    (NextState)
        (ScriptID)SearchResult(/ScriptID)
    (/NextState)
```

-continued

```
(/ScriptUnit)
(ScriptUnit)
    (ScriptID)SearchResult(/ScriptID)
    (StateDescription)
        (Keyword)xxxxxxxxx(/Keyword)
    (/StateDescription)
    (StyleDescription custom=yes)
        . . . . . . style specifications . . . . .
    (StyleDescription)
    (NextState)
        (ScriptID)bookorder(/ScriptID)
    (/NextState)
(/ScriptUnit)
(ScriptUnit)
    (ScriptID)phone lookup(/ScriptID)
    (StateDescription)
        (Keyword)xxxxxxxx(/Keyword)
    (/StateDescription)
    (StyleDescription)
        . . . . . . style specifications . . . . .
    (/StyleDescription)
    (NextState)
        (ScriptID) state name to follow the phone lookup flow
        (/ScriptID)
    (/NextState)
(/ScriptUnit)
```

Recognition of Components Included in the Host Screens

The recognition of components included in the host screens will now be described in greater detail. According to the present invention, components of host screens are recognized based on the organization of fields in the host screen. In particular, the organization is derived from the relative positions of the fields in the host screen. For example, columns in a table component can include fields that have the same start and end positions in the host screen, where the start and end positions are relative to an origin located at the leftmost position of the display of the host screen. Alternatively, a paragraph component can be organized as a table with one row.

Figure 4:
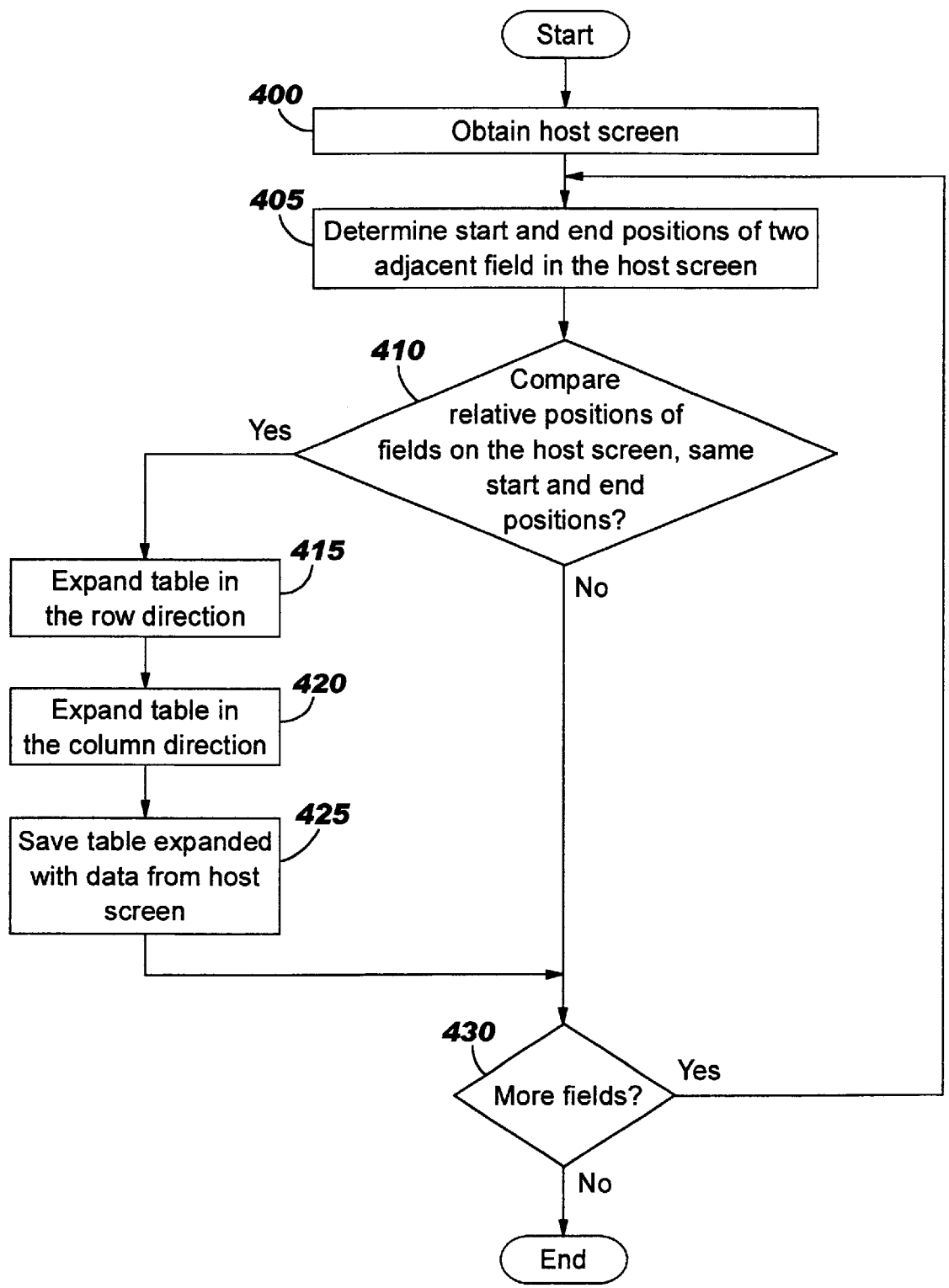
FIG. 4 is a flowchart that illustrates operations of recognizing components on a host screen according to the present invention.

FIG. 4 is a flowchart that illustrates an exemplary recognition of a table component in a host screen according to the present invention. The host screen, represented as a list of fields in the host screen, is obtained for processing (block 400). A start and end position for adjacent fields of the host screen is determined (block 405) and the start and end positions for the adjacent fields compared (block 410). In particular, if the two compared fields (block 410) have the same start and end positions, the compared fields represent a table with one column and two rows. The table is expanded horizontally (block 415) and vertically (block 420) with the data located in the compared fields and saved (block 425). If more fields of the host screen remain (block 430), processing continues at block 405.

Referring again to block 410, if the two compared fields (block 410) do not have the same start and end positions (block 410), the compared fields do not represent a table and processing continues at block 405 if more fields of the host screen remain (block 430).

The fields of the host screen processed in FIG. 4 can be described, for example, in an XML format. In particular, the positions of the fields included in the host screen are described using position and length data and any text included in the field. For example, if a first field is located at position 2 and is 79 positions long and a second field is located at position 82 and is 79 positions long, the first and second fields are located one height position apart at the same width position on the display of the host screen. In other words, the first and second fields are organized as a table that includes two rows and one column. Accordingly, the text associated with the first and second fields are recognized as data in a component table. Therefore, if the user selects a StyleDescription that includes a table component, the table containing the first and second fields is recognized in the host search screen as a component to be part of the reformatted screen.

FIG. 5 is a screen shot of a reformatted screen including data recognized from a host screen and reformatted according to the present invention. In particular, the data from the application is provided as an XML data stream that includes more data than is shown in FIG. 5. According to FIG. 5, the refresh button 600, the upper table 605, the lower table 610, the command field 615 and the function keys 620 are displayed on the reformatted screen based on data recognized in the XML stream. The data from the XML stream which is recognized as matching the layout specified in the StyleDescription is extracted from the XML data stream and displayed on the reformatted screen according to the selected layout and the style. For example, the data recognized from the XML stream used to display the lower table 610 may precede in the host screen the data recognized from the XML stream that comprises the upper table 605. Exemplary XML data streams corresponding to FIG. 5 are provided below.

A table can have an associated table header that refers to components of the table. For example, a table header can identify a row or column of data in the table. A table header can be recognized by determining the spatial relationship of the table components and the table header. For example, the position and the length of the fields that define the table can be compared to position and lengths of the fields that comprise the table header.

The display of a table can also be separated over a series of host screens, such as when a search result displayed in table format is too long to display on a single host screen. In such a case, the layout of the re-formatted screen may be a single table, wherein the data is extracted from the series of host screens. A table item index can be recognized to assist in extracting the data in the series of host screens. For example, in some screens the table item index reflects a range of the current host screen of a total number of screens such as: 1 to 6 of 14. The table item index can be extracted from the host screen by recognizing the format of the table item index as a first number "to" a second number "of" a third number in a single line in the host screen.

Table can also include table action instructions that specify actions to be taken upon input of the specified instruction. For example, some table action instructions may specify that A=Address and O=Update. When the user inputs A, for example, an address request is provided to the host. The table action instruction can be recognized based on the organization of the data in the host screen, such as by recognizing a single character followed by an =which is followed by a string as shown above.

A command line in the host screen allows the use to provide input to the host via an input field. The command line can be recognized, for example, by recognizing an input field that follows a indication that user input is solicited, such as a ===) character string that draws attention to the input field.

A function key associates functions to be performed with a visual appearance of a key in the host screen. Function keys can be recognized by the organization of the characters that identify the function key relative to the function to be carried out. For example, function keys can be extracted by recognizing the a function key as "n=xxx", "Fn=xxx", "Fn xxx", or the like.

A host screen can also include a paragraph component. Paragraphs are text information separated by new lines. A paragraph can be extracted by recognizing, for example, a table that includes a single column where each row expands the whole line.

A selection list is a list of numbered options. An option from the list can be selected by typing the number associated with the option from the selection list. The selection list can be extracted from the host screen by recognizing the numbers and the spatial relation between the options. For example, each selection on the selection list may comprise a number followed by a period followed by a space which is followed by a text string. The periods may be vertically aligned in the host screen. In addition, the number may begin the number 1 or 0. It will be understood that the recognition examples recited above are exemplary, and analogous recognition techniques may be used to recognize other components.

```
(?xml version="1.0" encoding="ISO-8859-1"?)
(xml_data)
(xml_tables)
 (xml_table rowsize="6" columnsize="5" id="1")
  (xml_table_head)
   (xml_tr)
    (xml_th)
     Name
    (/xml_th)
    (xml_th)
     Act
    (/xml_th)
    (xml_th)
     EmpSt
    (/xml_th)
    (xml_th)
     Tie-line
    (/xml_th)
    (xml_th)
     Node    User ID External-Phone
    (/xml_th)
   (/xml_tr)
  (/xml_table_head)
  (xml_table_body)
```

-continued

```
(xml_tr)
 (xml_td row="1" column="1" input="false" password="false" id="1042" length="26")Li, Michael C. T.    (/xml_td)
 (xml_td row="1" column="2" input="true" password="false" id="1069" length="1")(/xml_td)
 (xml_td row="1" column="3" input="true" password="false" id="1072" length="5")Reg (/xml_td)
 (xml_td row="1" column="4" input="true" password="false" id="1078" length="8")541-4095(/xml_td)
 (xml_td row="1" column="5" input="true" password="false" id="1087" length="33")IBMUSM37 MCLI 1-919-301-4095 (/xml_td)
(/xml_tr)
(xml_tr)
 (xml_td row="2" column="1" input="false" password="false" id="1122" length="26")Li, Rucy-Feng    (/xml_td)
 (xml_td row="2" column="2" input="true" password="false" id="1149" length="1")(/xml_td)
 (xml_td row="2" column="3" input="true" password="false" id="1152" length="5")Mgr (/xml_td)
 (xml_td row="2" column="4" input="true" password="false" id="1158" length="8")526-5030(/xml_td)
 (xml_td row="2" column="5" input="true" password="false" id="1167" length="33")IBMUSM21 RL10 1-919-486-5030(/xml_td)
(/xml_tr)
(xml_tr)
 (xml_td row="3" column="1" input="false" password="false" id="1202" length="26")Li, Shuping *CONTRACTOR*    (/xml_td)
 (xml_td row="3" column="2" input="true" password="false" id="1229" length="1")(/xml_td)
 (xml_td row="3" column="3" input="true" password="false" id="1232" length="5")Contr(/xml_td)
 (xml_td row="3" column="4" input="true" password="false" id="1238" length="8")352-5937(/xml_td)
 (xml_td row="3" column="5" input="true" password="false" id="1247" length="33")1-919-301-5937 (/xml_td)
(/xml_tr)
(xml_tr)
 (xml_td row="4" column="1" input="false" password="false" id="1282" length="26")Li, Xiaobo    (/xml_td)
 (xml_td row="4" column="2" input="true" password="false" id="1309" length="1")(/xml_td)
 (xml_td row="4" column="3" input="true" password="false" id="1312" length="5")Reg (/xml_td)
 (xml_td row="4" column="4" input="true" password="false" id="1318" length="8")(/xml_td)
 (xml_td row="4" column="5" input="true" password="false" id="1327" length="33")IBMUSM38 LIX   1-919-486-2441 (/xml_td)
(/xml_tr)
(xml_tr)
 (xml_td row="5" column="1" input="false" password="false" id="1362" length="26")Li, Yi *CONTRACTOR*    (/xml_td)
 (xml_td row="5" column="2" input="true" password="false" id="1389" length="1")(/xml_td)
 (xml_td row="5" column="3" input="true" password="false" id="1392" length="5")Contr(/xml_td)
 (xml_td row="5" column="4" input="true" password="false" id="1398" length="8")444-4904(/xml_td)
 (xml_td row="5" column="5" input="true" password="false" id="1407" length="33")IBMUSM27 YILI   1-919-254-4904(/xml_td)
(/xml_tr)
(xml_tr)
 (xml_td row="6" column="1" input="false" password="false" id="1442" length="26")Li, Yongcheng    (/xml_td)
 (xml_td row="6" column="2" input="true" password="false" id="1469" length="1")(/xml_td)
 (xml_td row="6" column="3" input="true" password="false" id="1472" length="5")Reg (/xml_td)
 (xml_td row="6" column="4" input="true" password="false" id="1478" length="8")526-2693(/xml_td)
 (xml_td row="6" column="5" input="true" password="false" id="1487" length="33")RALVMS YCLI 1-919-486-2693(/xml_td)
(/xml_tr)
(/xml_table_body)
(/xml_table)
(/xml_tables)
(xml_table_item_index)
 (xml_table_item_index_from)
  1
 (/xml_table_item_index_from)
 (xml_table_item_index_to)
  6
 (/xml_table_item_index_to)
 (xml_table_item_index_of)
  14
 (/xml_table_item_index_of)
(/xml_table_item_index)
(xml_table_action_instructions)
(xml_table_action_instruction id="0")
 (xml_table_action_code)
  A
 (/xml_table_action_code)
 (xml_table_action_caption)
  Address
 (/xml_table_action_caption)
(/xml_table_action_instruction)
(xml_table_action_instruction id="1")
 (xml_table_action_code)
  B
 (/xml_table_action_code)
 (xml_table_action_caption)
  Backup
 (/xml_table_action_caption)
(/xml_table_action_instruction)
(xml_table_action_instruction id="2")
 (xml_table_action_code)
  C
 (/xml_table_action_code)
 (xml_table_action_caption)
  CC-list
```

-continued

```
 (/xml_table_action_caption)
(/xml_table_action_instruction)
(xml_table_action_instruction id="3")
 (xml_table_action_code)
  E
 (/xml_table_action_code)
 (xml_table_action_caption)
  Dept title
 (/xml_table_action_caption)
(/xml_table_action_instruction)
(xml_table_action_instruction id="4")
 (xml_table_action_code)
  F
 (/xml_table_action_code)
 (xml_table_action_caption)
  Feedback
 (/xml_table_action_caption)
(/xml_table_action_instruction)
(xml_table_action_instruction id="5")
 (xml_table_action_code)
  I
 (/xml_table_action_code)
 (xml_table_action_caption)
  Show Ids
 (/xml_table_action_caption)
(/xml_table_action_instruction)
(xml_table_action_instruction id="6")
 (xml_table_action_code)
  J
 (/xml_table_action_code)
 (xml_table_action_caption)
  JobResp(1 pers)
 (/xml_table_action_caption)
(/xml_table_action_instruction)
(xml_table_action_instruction id="7")
 (xml_table_action_code)
  K
 (/xml_table_action_code)
 (xml_table_action_caption)
  Calendar
 (/xml_table_action_caption)
(/xml_table_action_instruction)
(xml_table_action_instruction id="8")
 (xml_table_action_code)
  L
 (/xml_table_action_code)
 (xml_table_action_caption)
  Local data
 (/xml_table_action_caption)
(/xml_table_action_instruction)
(xml_table_action_instruction id="9")
 (xml_table_action_code)
  O
 (/xml_table_action_code)
 (xml_table_action_caption)
  Update/Open
 (/xml_table_action_caption)
(/xml_table_action_instruction)
(xml_table_action_instruction id="10")
 (xml_table_action_code)
  P
 (/xml_table_action_code)
 (xml_table_action_caption)
  Phones
 (/xml_table_action_caption)
(/xml_table_action_instruction)
(xml_table_action_instruction id="11")
 (xml_table_action_code)
  R
 (/xml_table_action_code)
 (xml_table_action_caption)
  Rpts-To-All
 (/xml_table_action_caption)
(/xml_table_action_instruction)
(xml_table_action_instruction id="12")
 (xml_table_action_code)
  T
 (/xml_table_action_code)
 (xml_table_action_caption)
```

```
      To-list
    (/xml_table_action_caption)
  (/xml_table_action_instruction)
  (xml_table_action_instruction id="13")
    (xml_table_action_code)
      U
    (/xml_table_action_code)
    (xml_table_action_caption)
      Rpts-Chain
    (/xml_table_action_caption)
  (/xml_table_action_instruction)
  (xml_table_action_instruction id="14")
    (xml_table_action_code)
      V
    (/xml_table_action_code)
    (xml_table_action_caption)
      View record
    (/xml_table_action_caption)
  (/xml_table_action_instruction)
 (/xml_table_action_instructions)
(xml_commandlines)
 (xml_commandline id="0" length="65" hidden="false" position="1615" value=" ")
  (xml_command_name)
    Command ===>:
  (/xml_command_name)
 (/xml_commandline)
(/xml_commandlines)
(xml_function_keys)
 (xml_function_key value="[f1]")
  (xml_fk_caption)Help (/xml_fk_caption)
 (/xml_function_key)
 (xml_function_key value="[f2]")
  (xml_fk_caption)Set 2 (/xml_fk_caption)
 (/xml_function_key)
 (xml_function_key value="[f3]")
  (xml_fk_caption)Exit (/xml_fk_caption)
 (/xml_function_key)
 (xml_function_key value="[f4]")
  (xml_fk_caption)Send note (/xml_fk_caption)
 (/xml_function_key)
 (xml_function_key value="[f5]")
  (xml_fk_caption)Rpts-To-All (/xml_fk_caption)
 (/xml_function_key)
 (xml_function_key value="[f6]")
  (xml_fk_caption)Show dept/team (/xml_fk_caption)
 (/xml_function_key)
 (xml_function_key value="[f7]")
  (xml_fk_caption)Backward (/xml_fk_caption)
 (/xml_function_key)
 (xml_function_key value="[f8]")
  (xml_fk_caption)Forward (/xml_fk_caption)
 (/xml_function_key)
 (xml_function_key value="[f9]")
  (xml_fk_caption)JobResp(all) (/xml_fk_caption)
 (/xml_function_key)
 (xml_function_key value="[f10]")
  (xml_fk_caption)Actions (/xml_fk_caption)
 (/xml_function_key)
 (xml_function_key value="[f11]")
  (xml_fk_caption)Dist list      (/xml_fk_caption)
 (/xml_function_key)
 (xml_function_key value="[f12]")
  (xml_fk_caption)Cancel             (/xml_fk_caption)
 (/xml_function_key)
 (xml_function_key value="{enter}")
  (xml_fk_caption)Press Enter(/xml_fk_caption)
 (/xml_function_key)
(/xml_function_keys)(/xml_data)
(?xml version="1.0" encoding="ISO-8859-1"?)
(xml_host_data)
 (session)
  (id type="1")Session A(/id)
  (description)    (/description)
  (host port="23")ralvms(/host)
  (size)2(/size)
 (/session)
 (screen)
  (content)
    (field position="4" length="4" protected="false" numeric="false" hidden="false" reset="false" modified="false")File(/field)
```

-continued (field position="10" length="10" protected="false" numeric="false" hidden="false" reset="false" modified="false")Distribute(/field)
(field position="22" length="7" protected="false" numeric="false" hidden="false" reset="false" modified="false")Inquire(/field)
(field position="31" length="7" protected="false" numeric="false" hidden="false" reset="false" modified="false")Options(/field)
(field position="40" length="4" protected="false" numeric="false" hidden="false" reset="false" modified="false")Help(/field)
(field position="45" length="35" protected="true" numeric="true" hidden="false" reset="false" modified="false")            (/field)
(field position="82" length="78" protected="true" numeric="true" hidden="false" reset="false" modified="false")_____ (/field)
(field position=⌠162" length="78" protected="true" numeric="true" hidden="false" reset="false" modified="false")200        Search Results          (/field)
(field position="242" length="78" protected="true" numeric="true" hidden="false" reset="false" modified="false")        (/field)
(field position="322" length="78" protected="true" numeric="true" hidden="false" reset="false" modified="false")For a record, press a function key -or- type an Action Code and press Enter. (/field)
(field position="403" length="77" protected="true" numeric="true" hidden="false" reset="false" modified="false") A=Address    B=Backup    C=CC-list    E=Dept title    F=Feedback       (/field)
(field position="483" length="77" protected="true" numeric="true" hidden="false" reset="false" modified="false") I=Show Ids    J=JobResp(1pers)    K=Calendar    L=Local data    O=Update/Open    (/field)
(field position="563" length="77" protected="true" numeric="true" hidden="false" reset="false" modified="false") P=Phones    R=Rpts-To-All    T=To-list    U=Rpts-Chain    V=View record        (/field)
(field position="642" length="58" protected="true" numeric="true" hidden="false" reset="false" modified="false")
    (/field)
(field position="701" length="5" protected="true" numeric="true" hidden="false" reset="false" modified="false")Lines(/field)
(field position="707" length="2" protected="false" numeric="false" hidden="false" reset="false" modified="false") 1(/field)
(field position="710" length="10" protected="true" numeric="true" hidden="false" reset="false" modified="false")to 6 of 14(/field)
(field position="722" length="53" protected="true" numeric="true" hidden="false" reset="false" modified="false")
(/field)
(field position="776" length="7" protected="true" numeric="true" hidden="false" reset="false" modified="false")Columns(/field)
(field position="784" length="3" protected="false" numeric="false" hidden="false" reset="false" modified="false") 34(/field)
(field position="788" length="12" protected="true" numeric="true" hidden="false" reset="false" modified="false")to 81 of 141(/field)
(field position="802" length="78" protected="true" numeric="true" hidden="false" reset="false" modified="false")ASSIGNEE RTP WASHA07
        (/field)
(field position="882" length="78" protected="true" numeric="true" hidden="false" reset="false" modified="false")
        (/field)
(field position="962" length="24" protected="true" numeric="true" hidden="false" reset="false" modified="false")Name        (/field)
(field position="988" length="3" protected="true" numeric="true" hidden="false" reset="false" modified="false")Act(/field)
(field position="992" length="5" protected="true" numeric="true" hidden="false" reset="false" modified="false")EmpSt(/field)
(field position="998" length="8" protected="true" numeric="true" hidden="false" reset="false" modified="false")Tie-line(/field)
(field position="1007" length="33" protected="true" numeric="true" hidden="false" reset="false" modified="false")Node    User ID External-Phone (/field)
(field position="1042" length="26" protected="true" numeric="true" hidden="false" reset="false" modified="false")Li, Michael C. T.    (/field)
(field position="1069" length="1" protected="false" numeric="false" hidden="false" reset="false" modified="false")(/field)
(field position="1072" length="5" protected="false" numeric="false" hidden="false" reset="false" modified="false")Reg (/field)
(field position="1078" length="8" protected="false" numeric="false" hidden="false" reset="false" modified="false")541-4095(/field)
(field position="1087" length="33" protected="false" numeric="false" hidden="false" reset="false" modified="false")IBMUSM37 MCLI 1-919-301-4095 (/field)
(field position="1122" length="26" protected="true" numeric="true" hidden="false" reset="false" modified="false")Li, Ruey-Feng    (/field)
(field position="1149" length="1" protected="false" numeric="false" hidden="false" reset="false" modified="false")(/field)
(field position="1152" length="5" protected="false" numeric="false" hidden="false" reset="false" modified="false")Mgr (/field)
(field position="1158" length="8" protected="false" numeric="false" hidden="false" reset="false" modified="false")526-5030(/field)
(field position="1167" length="33" protected="false" numeric="false" hidden="false" reset="false" modified="false")IBMUSM21 RL10    1-919-486-5030 (/field)
(field position="1202" length="26" protected="true" numeric="true" hidden="false" reset="false" modified="false")Li, Shuping    *CONTRACTOR* (/field)
(field position="1229" length="1" protected="false" numeric="false" hidden="false" reset="false" modified="false")(/field)
(field position="1232" length="5" protected="false" numeric="false" hidden="false" reset="false" modified="false")Contr(/field)
(field position="1238" length="8" protected="false" numeric="false" hidden="false" reset="false" modified="false")352-5937(/field)
(field position="1247" length="33" protected="false" numeric="false" hidden="false" reset="false" modified="false")1-919-301-5937 (/field)
(field position="1282" length="26" protected="true" numeric="true" hidden="false" reset="false" modified="false")Li, Xiaobo    (/field)
(field position="1309" length="1" protected="false" numeric="false" hidden="false" reset="false" modified="false")(/field)
(field position="1312" length="5" protected="false" numeric="false" hidden="false" reset="false" modified="false")Reg (/field)
(field position="1318" length="8" protected="false" numeric="false" hidden="false" reset="false" modified="false")(/field)
(field position="1327" length="33" protected="false" numeric="false" hidden="false" reset="false" modified="false")IBMUSM38 LIX    1-919-486-2441 (/field)
(field position="1362" length="26" protected="true" numeric="true" hidden="false" reset="false" modified="false")Li, Yi *CONTRACTOR* (/field)
(field position="1389" length="1" protected="false" numeric="false" hidden="false" reset="false" modified="false")(/field)
(field position="1392" length="5" protected="false" numeric="false" hidden="false" reset="false" modified="false")Contr(/field)
(field position="1398" length="8" protected="false" numeric="false" hidden="false" reset="false" modified="false")444-4904(/field)
(field position="1407" length="33" protected="false" numeric="false" hidden="false" reset="false" modified="false")IBMUSM27 YILI    1-919-254-4904 (/field)
(field position="1442" length="26" protected="true" numeric="true" hidden="false" reset="false" modified="false")Li, Yongcheng    (/field)
(field position="1469" length="1" protected="false" numeric="false" hidden="false" reset="false" modified="false")(/field)
(field position="1472" length="5" protected="false" numeric="false" hidden="false" reset="false" modified="false")Reg (/field)
(field position="1478" length="8" protected="false" numeric="false" hidden="false" reset="false" modified="false")526-2693(/field)
(field position="1487" length="33" protected="false" numeric="false" hidden="false" reset="false" modified="false")RALVMS YCLI 1-919-486-2693 (/field)
(field position="1521" length="79" protected="true" numeric="false" hidden="false" reset="false" modified="false")(©) Copyright IBM Corporation 1988, 1992. All rights reserved        (/field)

-continued

```
          (field position="1602" length="12" protected="true" numeric="true" hidden="false" reset="false" modified="false")Command ===&get:(/field)
          (field position="1615" length="65" protected="false" numeric="false" hidden="false" reset="false" modified="false")
              (/field)
          (field position="1682" length="78" protected="true" numeric="true" hidden="false" reset="false" modified="false")F1=Help    F2=Set 2    F3=Exit
    F4=Send note    F5=Rpts-To-All    F6=Show dept/team    (/field)
          (field position="1762" length="78" protected="true" numeric="true" hidden="false" reset="false" modified="false")F7=Backward    F8=Forward
    F9=JobResp(all)    F10=Actions    F11=Dist list        (/field)
          (field position="1842" length="78" protected="true" numeric="true" hidden="false" reset="false" modified="false")F12=Cancel
                   (/field)    (/content)
      (interaction/)
    (/screen)
(/xml_host_data)
```

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of reformatting a host screen generated by an application that includes components thereon comprising:

utilizing a terminal emulation data structure embodied in a computer-readable medium that represents a state of interaction in a terminal emulation session provided between a resource and a client to provide:

a first tag that represents a present terminal emulation state of interaction between the client and the resource;

a second tag that represents output provided by the resource to the client based on the first tag;

a third tag that represents a next terminal emulation state of interaction between the client and the resource configured to be entered responsive to the present terminal emulation state represented by the first tag and the output provided by the resource represented by the second tag; and a fourth tag the represents a format for display of data associated with the present terminal emulation state;

determining if an organization of the components in the host screen matches a layout parameter of a reformatted screen associated with one of a plurality of predetermined styles; and automatically generating the reformatted screen using the fourth tag by arranging selected components from the host screen according to one of the plurality of predetermined styles if the organization of the components in the host screen matches the layout parameter of the reformatted screen associated with one of the plurality of the predetermined styles.

2. The method of claim 1, wherein the selected components comprise at least one of a field, a table, an input table, an action list, a select option, a function key list, a paragraph, a command line, and a title line.

3. The method of claim 1, wherein the layout parameter comprises at least one of a detailed layout, a plain layout, a blank layout, a paragraph layout, an input table layout, an action list layout, a selection option list layout, a function key list layout, a paragraph-table layout, a paragraph-input table layout, a paragraph-action list layout, a paragraph-select option list layout, a paragraph-function key selection list layout, a heading line-paragraph layout, a heading line-paragraph-table layout, a heading line-paragraph-input table layout, a heading line-paragraph-action-list layout, a heading line-paragraph-select option list layout, and a heading line-paragraph-function key selection list layout.

4. The method of claim 1, wherein the step of automatically generating comprises:

determining the organization for components in the host screen;

comparing the organization of the components in the host screen to the organization of a provided layout; and selecting the components from the host screen which match the organization of the provided layout.

5. The method of claim 4, wherein the step of comparing comprises:

determining a spatial relationship between components in the host screen; and comparing the spatial relationship between the components in the host screen to the organization of the provided layout.

6. The method of claim 4, wherein the step of comparing comprises:

determining starting and ending positions of sequentially ordered components on the host screen;

comparing the respective starting and ending positions of the sequentially ordered components on the host screen; and determining the organization of the components on the host screen based on the comparison of the respective starting and ending positions of the sequentially ordered components on the host screen.

7. The method of claim 4, wherein the step of determining the organization of components provides a first data structure that describes the organization of components selected from the host screen, the method further comprising:

generating a second data structure by including the selected components from the host screen in the first data structure; and generating the reformatted display based on the second data structure.

8. The method of claim 1 further comprising the step of generating a second reformatted screen when the layout of the reformatted screen associated with one of the plurality of the predetermined styles is changed.

9. The method of claim 1 further comprising:

displaying the host screen including the components therein;

selecting a layout to be applied to the host screen; and associating the selected layout with the host screen.

10. A system for reformatting a host screen generated by an application that includes components thereon comprising:

means for utilizing a terminal emulation data structure embodied in a computer-readable medium that represents a state of interaction in a terminal emulation session provided between a resource and a client comprising:

a first tag that represents a present terminal emulation state of interaction between the client and the resource;

a second tag that represents output provided by the resource to the client based on the first tag;

a third tag that represents a next terminal emulation state of interaction between the client and the resource configured to be entered responsive to the present terminal emulation state represented by the first tag and the output provided by the resource represented by the second tag; and a fourth tag the represents a format for display of data associated with the present terminal emulation state;

means for determining if an organization of the components in the host screen matches a layout parameter of a reformatted screen associated with one of a plurality of predetermined styles; and means for automatically generating the reformatted screen using the fourth tag by arranging selected components from the host screen according to one of the plurality of predetermined styles if the organization of the components in the host screen matches the layout parameter of the reformatted screen associated with one of the plurality of the predetermined styles.

11. The system of claim 10, wherein the selected components comprise at least one of a field, a table, an input table, an action list, a select option, a function key list, a paragraph, a command line, and a title line.

12. The system of claim 10, wherein the layout parameter comprises at least one of a detailed layout, a plain layout, a blank layout, a paragraph layout, an input table layout, an action list layout, a selection option list layout, a function key list layout, a paragraph-table layout, a paragraph-input table layout, a paragraph-action list layout, a paragraph-select option list layout, a paragraph-function key selection list layout, a heading line-paragraph layout, a heading line-paragraph-table layout, a heading line-paragraph-input table layout, a heading line-paragraph-action-list layout, a heading line-paragraph-select option list layout, and a heading line-paragraph-function key selection list layout.

13. The system of claim 10, wherein the means for automatically generating comprises:

means for determining the organization for components in the host screen;

means for comparing the organization of the components in the host screen to the organization of a provided layout; and means for selecting the components from the host screen which match the organization of the provided layout.

14. The system of claim 13, wherein the means for comparing comprises:

means for determining a spatial relationship between components in the host screen; and means for comparing the spatial relationship between the components in the host screen to the organization of the provided layout.

15. The system of claim 13, wherein the means for comparing comprises:

means for determining starting and ending positions of sequentially ordered components on the host screen;

means for comparing the respective starting and ending positions of the sequentially ordered components on the host screen; and means for determining the organization of the components on the host screen based on the comparison of the respective starting and ending positions of the sequentially ordered components on the host screen.

16. The system of claim 13, wherein the means for determining the organization of components provides a first data structure that describes the organization of components selected from the host screen, the system further comprising;

means for generating, a second data structure by including the selected components from the host screen in the first data structure; and means for generating the reformatted display based on the second data structure.

17. The system of claim 10 further comprising means for generating a second reformatted screen when the layout of the reformatted screen associated with one of the plurality of the predetermined styles is changed.

18. A computer program product that reformats a host screen generated by an application that includes components thereon comprising:

a computer-readable storage medium having computer-readable program code means embodied in said medium, said computer-readable program code means comprising:

computer readable program code means for utilizing, a terminal emulation data structure embodied in a computer-readable medium that represents a state of interaction in a terminal emulation session provided between a resource and a client comprising:

a first tag that represents a present terminal emulation state of interaction between the client and the resource;

a second tag that represents output provided by the resource to the client based on the first tag;

a third tag that represents a next terminal emulation state of interaction between the client and the resource configured to be entered responsive to the present terminal emulation state represented by the first tag and the output provided by the resource represented by the second tag; and a fourth tag the represents a format for display of data associated with the present terminal emulation state;

computer readable program code means for determining if an organization of the components in the host screen matches a layout parameter of a reformatted screen associated with one of a plurality of predetermined styles; and computer readable program code means for automatically generating the reformatted screen using the fourth tag by arranging selected components from the host screen according to one of the plurality of predetermined styles if the organization of the components in the host screen matches the layout parameter of the reformatted screen associated with one of the plurality of the predetermined styles.

19. The computer program product of claim 18, wherein the selected components comprise at least one of a field, a table, an input table, an action list, a select option, a function key list, a paragraph, a command line, and a title line.

20. The computer program product of claim 18, wherein the layout parameter comprises at least one of a detailed layout, a plain layout, a blank layout, a paragraph layout, an input table layout, an action list layout, a selection option list layout, a function key list layout, a paragraph-table layout, a paragraph-input table layout, a paragraph-action list layout, a paragraph-select option list layout, a paragraph-function key selection list layout, a heading line-paragraph layout, a heading line-paragraph-table layout, a heading line-paragraph-input table layout, a heading line-paragraph-action-list layout, a heading line-paragraph-select option list layout, and a heading line-paragraph-function key selection list layout.

21. The computer program product of claim 18, wherein the computer readable program code means for automatically generating comprises:

computer readable program code means for determining the organization for components in the host screen;

computer readable program code means for comparing the organization of the components in the host screen to the organization of the provided layout; and computer readable program code means for selecting the components from the host screen which match the organization of the provided layout.

22. The computer program product of claim 21, wherein the computer readable program code means for comparing comprises:

computer readable program code means for determining a spatial relationship between components in the host screen; and computer readable program code means for comparing the spatial relationship between the components in the host screen to the organization of the provided layout.

23. The computer program product of claim 21, wherein the computer readable program code means for comparing comprises:

computer readable program code means for determining starting and ending positions of sequentially ordered components on the host screen;

computer readable program code means for comparing the respective starting and ending positions of the sequentially ordered components on the host screen; and computer readable program code means for determining the organization of the components on the host screen based on the comparison of the respective starting and ending positions of the sequentially ordered components on the host screen.

24. The computer program product of claim 21, wherein the computer readable program code means for determining the organization of components provides a first data structure that describes the organization of components selected from the host screen, the computer program product further comprising:

computer readable program code means for generating a second data structure by including the selected components from the host screen in the first data structure; and computer readable program code means for generating the recommitted display based on the second data structure.

25. The computer program product of claim 18 further comprising computer readable program code means for generating a second reformatted screen when the layout of the reformatted screen associated with one of the plurality of the predetermined styles is changed.

26. A terminal emulation data structure embodied in a computer-readable medium that represents a state of interaction in a terminal emulation session provided between a resource and a client comprising:

a first tag that represents a present terminal emulation state of interaction between the client and the resource;

a second tag that represents output provided by the resource to the client based on the first tag;

a third tag that represents a next terminal emulation state of interaction between the client and the resource configured to be entered responsive to the present terminal emulation state represented by the first tag and the output provided by the resource represented by the second tag; and a fourth tag the represents a format for display of data associated with the present terminal emulation state.

27. The terminal emulation data structure of claim 26 further comprising a fifth tag that represents input from the client to the resource, wherein the fifth tag is based on the first tag.

28. The terminal emulation data structure of claim 26, wherein the tags are XML tags.

29. The terminal emulation data structure of claim 26, wherein the tags are created using a graphical editor.

30. The terminal emulation data structure of claim 26, wherein the third tag represents a next terminal emulation state of interaction between the client and the resource selected from a plurality of next possible terminal emulation states of interaction between the client and the resource based on the second tag.

* * * * *